No. 819,214. PATENTED MAY 1, 1906.
L. G. GALLUP.
VEHICLE LOCK SHOE.
APPLICATION FILED SEPT. 20, 1905.
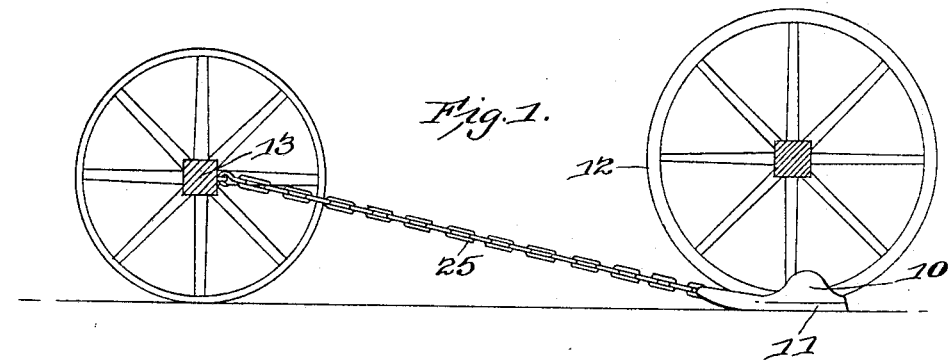
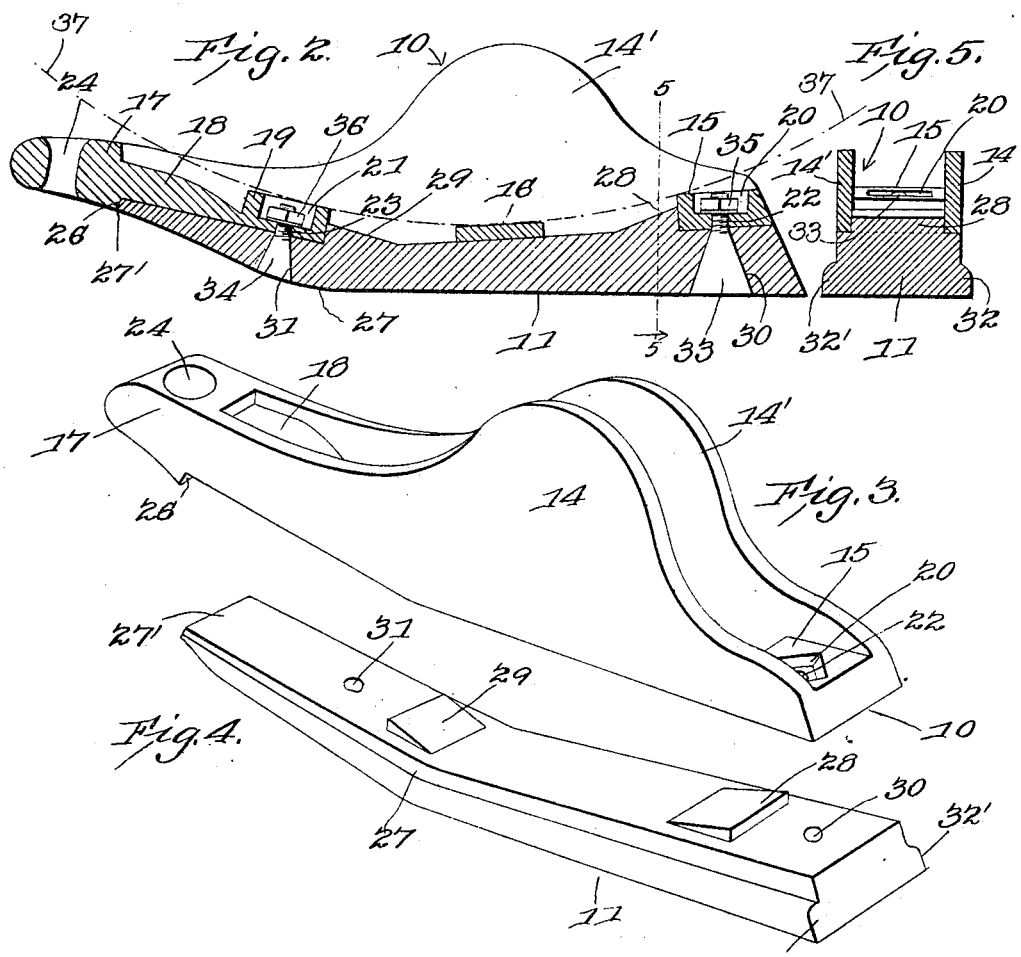
Witnesses
Lloyd G. Gallup, Inventor.
by C. A. Snow & Co.
Attorneys

UNITED STATES PATENT OFFICE.

LLOYD G. GALLUP, OF WALTON, NEW YORK.

VEHICLE LOCK-SHOE.

No. 819,214.   Specification of Letters Patent.   Patented May 1, 1906.

Application filed September 20, 1905. Serial No. 279,344.

*To all whom it may concern:*

Be it known that I, LLOYD G. GALLUP, a citizen of the United States, residing at Walton, in the county of Delaware and State of New York, have invented a new and useful Vehicle Lock-Shoe, of which the following is a specification.

This invention relates to lock-shoes for vehicles, and has for an object to provide a device of the class embodying new and improved features of economy, durability, convenience, and efficiency.

A further object of the invention is to provide a lock-shoe having a boxing to receive the wheel of a vehicle and an improved interchangeable wear-plate which when worn may be removed from the boxing and a new one substituted at small expense and with little labor.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit or sacrificing any of the advantages of this invention.

In the drawings, Figure 1 is a view in side elevation of the lock-shoe applied to a vehicle. Fig. 2 is a longitudinal sectional view of the shoe complete. Fig. 3 is a perspective view of the boxing. Fig. 4 is a perspective view of the wear-plate. Fig. 5 is a transverse sectional view taken on line 5 5 of Fig. 2.

Like characters of reference indicate corresponding parts in all of the figures of the drawings.

In its preferred embodiment the improved lock-shoe forming the subject-matter of this application comprises a boxing (designated as a whole at 10) and a wear-plate, (designated by the numeral 11.) The shoe is in any size and width to fit wheels of any radius. In Fig. 1 the device is applied to a diagrammatic vehicle in which the rear wheel is shown as 12 and the forward axle as 13.

The boxing comprises side plates 14 14' of any approved form and here shown as being curved downwardly and each way from a point of maximum height adjacent the middle. The boxing is open at the bottom and has the strips 15 and 16 extending transversely thereof. At its forward end the sides are united by the nose 17 and with a brace portion 18 extending rearwardly and enlarged, as at 19, to form a rib similar to the strip 15. The strip 15 and rib 19 are provided at their upper surfaces with recesses 20 and 21, respectively, through the bottom of which and through the said strip and rib are formed the bolt-holes 22 and 23. The nose 17 is provided with an opening 24, in which is secured a chain 25, and upon the under side is formed a shoulder 26, trranversely of the boxing.

For association with the boxing the wear-plate 11 is shaped to conform to the under side of the boxing and here shown as curved somewhat at 27, with the forward end reduced somewhat in thickness, as at 27', to fit and engage against the shoulder 26. Upon the upper surface of the plate are formed lugs 28 and 29, proportioned and disposed to bear against the strip 15 and rib 19, respectively, and to substantially fill the space between the sides 14 14' to prevent displacement. The plate is provided with tapered openings 30 and 31, the upper ends of which register with the bolt-holes 22 23 and along the sides are provided the laterally-extending ribs 32 32' to receive the wear upon the sides of the shoe. Within the tapered openings 30 31 are disposed the tapered bolts 33 34, respectively, with their upper screw-threaded ends extending through the bolt-holes 22 23 and engaged by the nuts 35 36 within the recesses 20 21.

A wheel (indicated at 12 and by the curved line 37) will be engaged within the boxing and bearing upon the strips 15 and 16 and the rib 19. The chain 25, attached at one end at the opening 24, is attached at its other end to any approved portion of the vehicle, as the forward axle 13, by which means the lock-shoe is used in the usual well-known manner.

It will be readily seen that the ribs 32 32' will receive the wear upon the carrier of the shoe and as they extend laterally beyond the plate and boxing will prevent side wear upon the boxing. The wear-plate being preferably an integral casting, can be quickly and cheaply replaced when worn, and the boxing will last indefinitely, as it is subjected to practically no wear.

Having thus described the invention, what is claimed is—

1. A lock-shoe comprising a boxing open at the bottom, cross-strips therein and integral therewith, a wear-plate within the bottom of the boxing and extending under and held against longitudinal movement by the strips, and means for detachably securing the plate to the strips.

2. A lock-shoe comprising a boxing open at the bottom, cross-strips therein and integral therewith, a wear-plate seated in the bottom of the boxing and extending under the cross-strips, lugs thereon contacting with the strips to hold the plate against longitudinal movement, and means for detachably securing the plate to the strips.

3. A lock-shoe comprising a boxing open at the bottom, cross-strips integral therewith, a brace portion within the boxing, a wear-plate within the bottom of the boxing and extending under the cross-strips and brace portion, lugs upon the wear-plate and interposed between and contacting with the cross-strips, and means for detachably securing the plate to said strips.

4. A lock-shoe comprising, a boxing open at the bottom and having strips transversely thereof, a wear-shoe provided with tapered openings registering with openings through the strips and tapered bolts proportioned to fit the tapered openings and extend through the openings in the strips.

5. A lock-shoe comprising a boxing open at the bottom and provided with strips transversely thereof, a wear-plate provided with tapered openings registering with openings formed through the strips and with lugs proportioned to engage the strips and the sides of the boxing and tapered bolts proportioned to fit the tapered openings and extend through the openings in the strips.

6. A lock-shoe comprising, a boxing open at the bottom and provided with strips transversely thereof, a wear-plate covering the bottom of and extending laterally beyond the boxing and provided with tapered openings registering with openings formed through the strips and having lugs proportioned to engage the strips and the sides of the boxing and tapered bolts proportioned to fit the tapered openings and extend through the openings in the strips.

In testimony that I claim the foregoing as my own I have hereto affixed my signature in the presence of two witnesses.

LLOYD G. GALLUP.

Witnesses:
JAMES M. PEAKE,
WM. J. GADWOOD.